(12) United States Patent
Lin

(10) Patent No.: US 7,782,391 B2
(45) Date of Patent: Aug. 24, 2010

(54) CAMERA MODULE HAVING A STRUCTURE FOR PREVENTING EXTERNAL ELECTRONIC WAVES AND NOISE FROM BEING INTRODUCED INTO THE CAMERA MODULE

(75) Inventor: Ming-Yuan Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 288 days.

(21) Appl. No.: 11/935,367

(22) Filed: Nov. 5, 2007

(65) Prior Publication Data

US 2009/0033790 A1 Feb. 5, 2009

(30) Foreign Application Priority Data

Aug. 1, 2007 (CN) .......................... 2007 1 0201243

(51) Int. Cl.
*H04N 5/225* (2006.01)
(52) U.S. Cl. ........................................ 348/340; 348/374
(58) Field of Classification Search ....................... None
See application file for complete search history.

(56) References Cited

U.S. PATENT DOCUMENTS

| | | | | |
|---|---|---|---|---|
| 4,926,227 A | * | 5/1990 | Jensen .......................... | 257/467 |
| 6,849,915 B1 | | 2/2005 | Tsai | |
| 7,084,391 B1 | * | 8/2006 | Chen .......................... | 250/239 |
| 7,361,880 B2 | * | 4/2008 | Webster .................... | 250/208.1 |
| 2002/0163589 A1 | * | 11/2002 | Yukawa et al. .............. | 348/374 |
| 2006/0181633 A1 | | 8/2006 | Seo | |
| 2006/0227236 A1 | * | 10/2006 | Pak ............................ | 348/340 |

FOREIGN PATENT DOCUMENTS

| | | |
|---|---|---|
| CN | 2770095 Y | 4/2006 |
| CN | 1885908 A | 12/2006 |

* cited by examiner

*Primary Examiner*—Luong T Nguyen
(74) *Attorney, Agent, or Firm*—Jeffrey T. Knapp

(57) ABSTRACT

A camera module includes a lens holder, a lens module, an image sensor chip, and a PCB defining a step-shaped recess on the upper thereof. The step-shaped recess comprises a first recess formed on an upper portion thereof and a second recess, for receiving a plurality of electrical elements therein, coaxially formed on a lower portion thereof, and a intermediate step surface formed between the first recess and the second recess. A cover plate received in the first recess and attached on the intermediate step surface defines at least one electronic layer therein and an external point formed on the bottom thereof. At least one zero voltage point is formed on the intermediate step surface thereof. The electronic layer is electrically connected to the zero voltage points by the external points, thereby electromagnetic waves generated by the electronic elements are prevented from affecting the image sensor chip.

15 Claims, 3 Drawing Sheets

CAMERA MODULE HAVING A STRUCTURE FOR PREVENTING EXTERNAL ELECTRONIC WAVES AND NOISE FROM BEING INTRODUCED INTO THE CAMERA MODULE

TECHNICAL FIELD

The present invention relates to the art of camera modules and, particularly, to a camera module having a structure for preventing external electromagnetic waves and noise from being introduced into the camera module, wherein the structure is simplified without using additional parts, whereby assembly of the camera module is improved, the manufacturing costs of the camera module are reduced, and the size of the camera module is decreased.

BACKGROUND

Because of advances in micro-circuitry and multimedia technology, digital cameras are now in widespread used. High-end portable electronic devices, such as mobile phones and Personal Digital Assistants (PDAs), are being developed to be increasingly multi-functional. Many of these portable electronic devices are popularly equipped with digital cameras. To facilitate portability, such portable electronic devices tend to be compact, slim, and light. Accordingly, digital cameras incorporated in the portable electronic devices have also been reduced in size and weight, yet remain cost-effective.

Referring to FIG. 3, a typical related digital camera module 1 includes a lens module 2, a lens holder 3, and an image sensor chip 4. The lens holder 3 is a hollow chamber. The lens module 2 includes a barrel 21 and a lens 22 received in the barrel 21. The barrel 21 is partially received in and is threadingly engaged with the lens holder 3. An infra-red (IR) cut filter 6 is adhered to a top surface of the image sensor chip 4 to protect the image sensor chip 4 against damage from IR light. The image sensor chip 4 is typically attached onto a printed circuit board 5. The image sensor chip 4 has a photosensitive area 41 formed on the top surface 40 thereof. The photosensitive area 41 is configured for receiving light signals transmitted through the lens module 2. A plurality of chip pads is formed on the top surface 40 for surrounding the photosensitive area 41. A plurality of bonding pads is formed on the printed circuit board 5 to electrically connect to the corresponding chip pads via wires. A plurality of elements 7 is adhered on the periphery of the printed circuit board 5 around the bonding pads. The lens holder 3 is mounted on the printed circuit board 5 so that the image sensor chip 4, the chip pads, the bonding pads, and the wires are received therein.

However, during operation of the camera module 1, a digital chip or radio frequency (RF) circuit of the element 7 adhered on the printed circuit board 5 generates electromagnetic waves. Thus, the electromagnetic waves can affect electric signals converted by the image sensor chip 4, thereby the image transmitted to a display unit, such as an LCD, is impacted. In addition, in the camera module 1, the printed circuit board 5 needs to provide sufficient space not only for the image sensor chip 4, the element 7, and the wires but also to for the mounting of the lens holder 3. To minimize the size and volume of the camera module 1 to a certain degree, an end portion 32 of the lens holder 3 is made thin. However, such a thin lens holder 3 is not easily manufactured by an injection molding method. This difficulty results in a relatively high cost. As such, the camera module 1 has not proven to be economically suitable for slim and compact electronic products.

What is needed, therefore, is a camera module that is not only compact and prevent external electromagnetic waves from being introduced into the camera module, but also economical to produce.

SUMMARY

In accordance with a present embodiment, a camera module includes a lens holder, a lens module, an image sensor chip, and a printed circuit board. The lens module is received in the lens holder. The lens module includes a lens barrel and at least one lens received in the lens barrel. The image sensor chip has a photosensitive area configured for receiving light transmitted through the lens module. The printed circuit board defines a top surface thereon. The top surface defines a step-shaped recess in the middle thereof. The step-shaped recess comprises a first recess formed on an upper portion and a second recess, for receiving a plurality of electrical elements therein, coaxially formed on a lower portion. The diameter of the first recess is greater than that of the second recess to form a intermediate step surface between the first recess and the second recess. A cover plate made from electrical material is received in the first recess and attached on the intermediate step surface. The cover plate defines at least one electronic layer therein and an external point formed on the bottom thereof. At least one zero voltage point is formed on the intermediate step surface for adjusting the voltage of the conductors connected to the zero voltage point to zero. The number of external points is equal to that of the zero voltage points. The electronic layer of the cover plate is electrically connected to the zero voltage points by the external points, thereby the cover plate can prevent electromagnetic waves generated by the electronic elements received in the second recess from affecting the image sensor chip received in the first recess. Therefore, communication jamming or malfunction of the image sensor chip is maximally prevented.

Other advantages and novel features will be drawn from the following detailed description of at least one preferred embodiment, when considered in conjunction with the attached drawings.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the camera module. Moreover, in the drawings, like reference numerals designate corresponding parts throughout the several views.

DESCRIPTION OF EMBODIMENTS

Embodiments of the present camera module will now be described in detail below with reference to the drawings.

Figure 1:
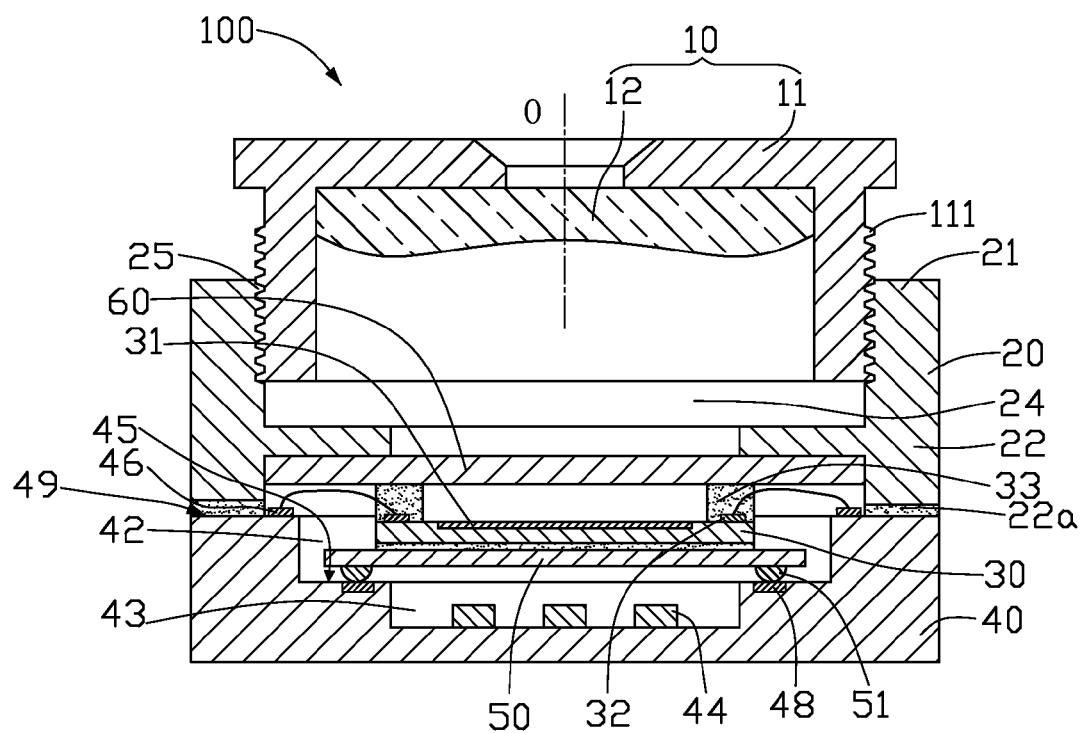
FIG. 1 is a schematic, cross-sectional view of a camera module in accordance with a first present embodiment.

Referring to FIG. 1, a camera module 100, in accordance with a first preferred embodiment, includes a lens module 10, a lens holder 20, an image sensor chip 30, a cover plate 50 and a printed circuit board (PCB) 40. The lens module 10 is partially received in the lens holder 20. The cover plate 50 is adhered to the bottom of the image sensor chip 30 and the sub-assembly of the cover plate 50 and the image sensor chip 30 is fixed to the PCB 40.

The lens module 10 includes a lens barrel 11 and at least one lens 12. The lens barrel 11 is configured for receiving the at least one lens 12 therein and has an external thread 111 formed thereon. In other embodiments, the at least one lens 12 could include two or more lenses received in the lens barrel 11.

The lens holder 20 having a stationary member has a front end 21 and a rear end 22, opposite to the front end 21, and defines a receiving cavity 24 penetrating/extending through the lens holder 20 from the front end 21 to the rear end 22. An internal thread 25 is formed on part of an inner surface of the lens holder 20, beginning at or adjacent to the front end 21. The lens barrel 11 is partially received in the lens holder 20 by engaging the external thread 111 of the lens barrel 11 with the internal thread 25 of the lens holder 20 such that the lens module 10 can be moved along the direction of the optical axis O. The lens holder 20 is mounted to a top surface of the PCB 40 by a bonding agent 22a. Preferably, the bonding agent 22a, which is used to securely fix the lens holder 20 to the PCB 40, is a conductive bonding agent, such as anisotropic conductive paste (ACP) or anisotropic conductive film (ACF).

The image sensor chip 30 has a photosensitive area 31 configured (i.e., structured and arranged) for receiving light transmitted through the lens module 10. The image sensor chip 30 has a first surface facing towards the lens module 10 and a second surface opposite to the first surface. A plurality of chip pads 32 is formed on a first surface surrounding the photosensitive area 31. An adhesive 33 is applied in patches between the photosensitive area 31 and the chip pad 32 or applied as a continuous layer surrounding the photosensitive area 31 and covering the chip pad 32. In this embodiment, the adhesive 33 is applied surrounding the photosensitive area 31 and covering the chip pad 32. The adhesive 33 is, beneficially, made of a curable adhesive material, for example, a silicone, epoxy, acrylic, or polyamide adhesive. The image sensor chip 30 is electrically connected to the PCB 40 such that the image focused on the photosensitive area 31 of the image sensor chip 30 is converted into electric signals, and is then transmitted to a display unit such as an LCD.

A transparent layer 60 is adhered to the first surface of the image sensor chip 30 via the adhesive 33. The transparent layer is a filter made of glass or some other suitably transparent material. The transparent layer 60 and the adhesive 33 cooperatively form a package structure for protecting the photosensitive area 31 of the image sensor chip 30.

The PCB 40 includes a top surface 49 thereof. The image sensor chip 30 is adhered to the middle portion of the top surface 49. A plurality of bonding pads 46 are formed directly on the top surface 49 surrounding the image sensor chip 30. Each board pad 46 is electrically connected to the corresponding chip pad 32 via a respective wire. The wires are advantageously made of a highly conductive, oxidation-resistant (to ensure long-term conductivity) material, such as gold, aluminum, or an alloy thereof.

The top surface 49 defines a step-shaped recess in the middle thereof. The step-shaped recess comprises a first recess 42 formed on an upper portion thereof and a second recess 43 coaxially formed on a lower portion thereof. The diameter of the first recess 42 is greater than that of the second recess 43 to form a intermediate step surface 45 between the first recess 42 and the second recess 43. The second recess 43 is provided for adhering at least one electronic element 44 on the bottom thereof. The electronic elements 44 can be, advantageously, passive elements or compositive elements. The electronic element 44 is electrically connected to the PCB 40. At least one zero voltage point 48 is formed on the intermediate step surface 45 thereof for adjusting the voltage of the conductors connected to the zero voltage point 48 to zero.

The cover plate 50 which is attached on the intermediate step surface 45 to cover the electrical elements 44 received in the second recess 43, may be made of electrically conductive material or alternatively be made of non-conductive material but has at least one electrically conductive layer or portion therein and an external point 51 formed on the bottom thereof to connect to the corresponding zero voltage point 48. In this embodiment, the zero voltage point 48 is four zero voltage points 48 respectively positioned on the corresponding corners of the intermediate step surface 45. The number of the external points 51 is equal to that of the zero voltage points 48. The cover plate 50 is adhered to the bottom of the image sensor chip 30 and the sub-assembly of the cover plate 50 and the image sensor chip 30 is received in the first recess 42 of the PCB 40. The size of the cover plate 50 is smaller than that of the first recess 42, but greater than that of the second recess 43 of the PCB 40. The electronic layer of the cover plate 50 is electrically connected to the zero voltage points 48 by the external points 51, thereby the cover plate 50 can prevent electromagnetic waves generated by the electronic elements 44 from affecting the image sensor chip 30. Thus, reliability of the camera module 100 is improved, and stable operation of the camera module 100 is also ensured.

Figure 2:
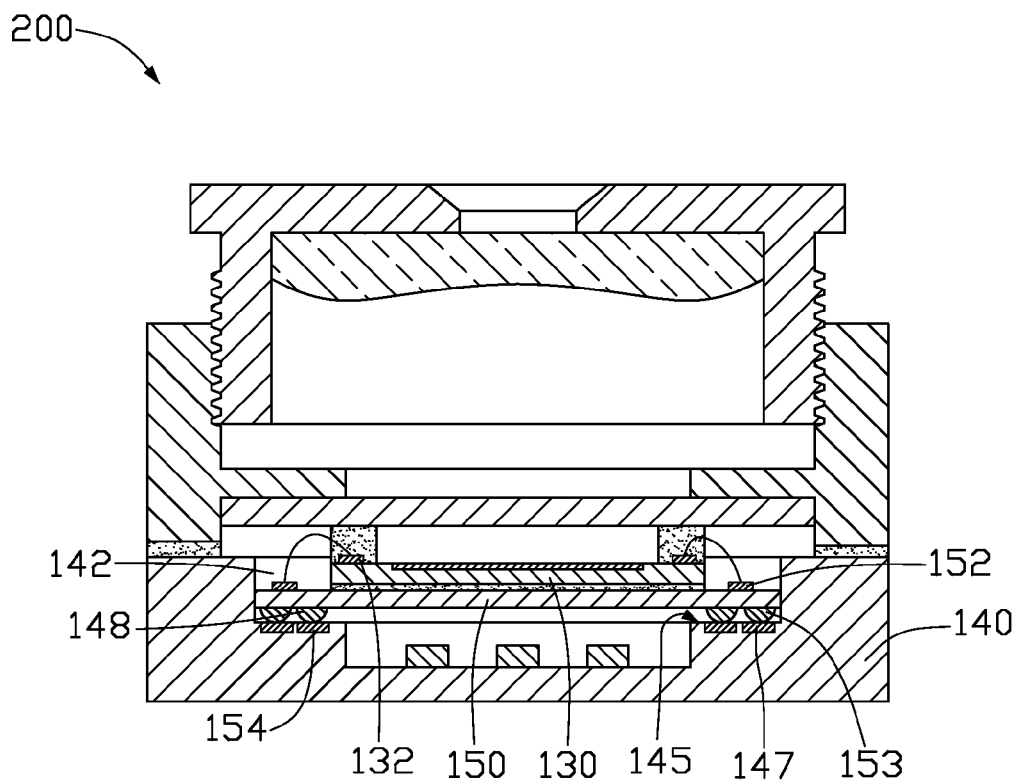
FIG. 2 is a schematic, cross-sectional view of a camera module in accordance with a second present embodiment.
Figure 3:
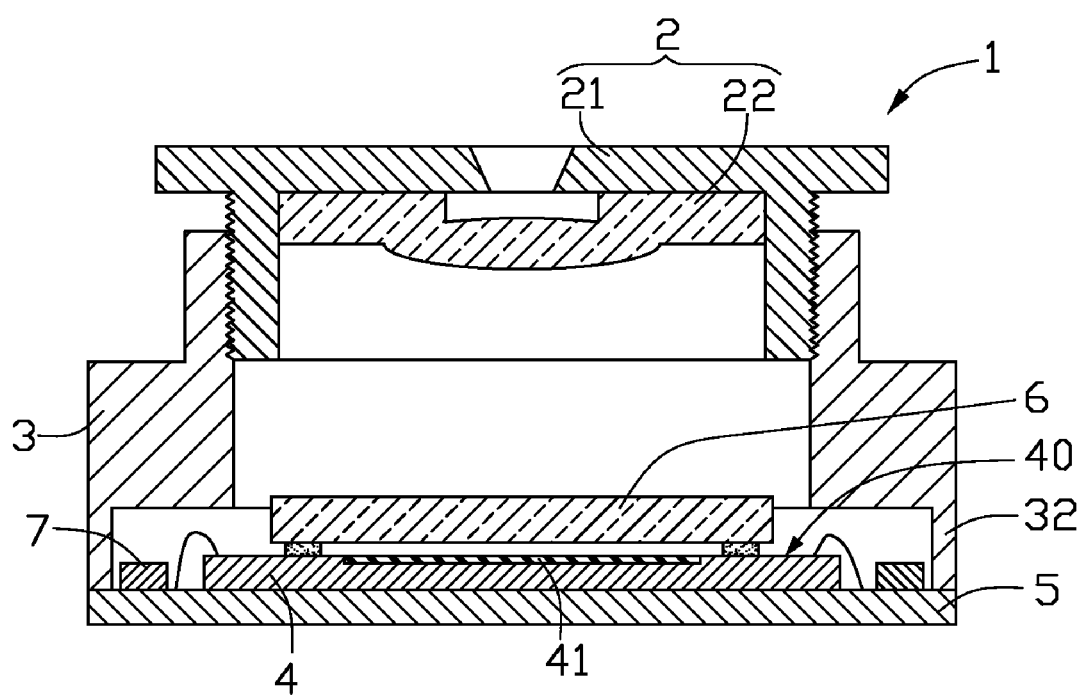
FIG. 3 is a schematic, cross-sectional view of a typical related camera module.

Referring to FIG. 2, a camera module 200, in accordance with a second preferred embodiment, is similar to the camera module 100 of the first embodiment. In this embodiment, the board pad 152 isn't formed on the top surface of the PCB 140, but formed on an upper surface of the cover plate 150 to connect the corresponding chip pad 132 via a wire. The cover plate 150 defines an external point 153 and a signal point 154 respectively formed on the bottom thereof. At the same time, the intermediate step surface 145 defines a zero voltage point 147 and a voltage point 148 to respectively connect the corresponding external point 153 and the signal point 154. The diameter of the cover plate 150 is equal to that of the first recess 142 of the PCB 140. The signal point 154 is electrically connected to the board pad 152, thereby the image focused on the image sensor chip 130 is converted into an electrical signal. Furthermore, a conductive layer of the cover plate 150 is electrically connected to the zero voltage point 147 by the external point 153, thereby the cover plate 150 can prevent the electromagnetic waves generated by the electronic elements from affecting the image sensor chip 130. Other configurations of the second embodiment are the same as that of the first embodiment, and so are not described in detail.

In addition, in the camera modules 100 and 200, the electronic elements are adhered to and received in the second recess formed on the top surface of the PCB, not directly positioned on the top surface of the PCB. Therefore, special space is not needed adjacent the PCB for positioning of the electronic elements thereon. Thus, the problematic thin walls of the related art can be replaced by more conveniently formed and stronger walls, or the space freed up could be used so that less precision in placement of elements is required, due to greater space availability for such, which could reduce manufacturing costs, or the camera modules could be made having a smaller diameter allowing for smaller electronic devices utilizing same.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A camera module comprising:
a lens holder defining a receiving portion thereof;
a lens module partially received in the receiving portion of the lens holder, the lens module comprising a lens barrel movably engaged in the lens holder and at least one lens received in the lens barrel;
an image sensor chip comprising a photosensitive area configured for receiving light transmitted through the lens module, and a plurality of chip pads formed surrounding the photosensitive area;
a circuit board comprising a top surface thereof for engaging with the lens holder, the circuit board comprising a first recess at an upper portion thereof, a second recess at a lower portion thereof and an intermediate step surface formed between the first recess and the second recess, the first recess provided for receiving the image sensor chip therein, the second recess provided for receiving at least one electronic element mounted on the bottom of the second recess, and at least one zero voltage point formed on the intermediate step surface thereof for adjusting the voltage of a plurality of conductors connected to the at least one zero voltage point to zero;
a cover plate attached on the intermediate step surface for covering the at least one electronic element received in the second recess, the cover plate having at least one external point formed on the bottom of the cover plate to connect to a corresponding zero voltage point; and
wherein the cover plate is electrically connected to a plurality of zero voltage points by a plurality of external points, the cover plate being configured for preventing electromagnetic waves generated by the at least one electronic element from affecting the image sensor chip.

2. The camera module as claimed in claim 1, wherein the size of first recess is greater than that of the second recess.

3. The camera module as claimed in claim 2, wherein the cover plate is made of electrically conductive material.

4. The camera module as claimed in claim 3, wherein the size of the cover plate is smaller than that of the first recess, but greater than that of the second recess.

5. The camera module as claimed in claim 3, wherein the circuit board includes a plurality of bonding pads to electrically connect to a plurality of corresponding chip pads by respective wires.

6. The camera module as claimed in claim 3, wherein the cover plate includes a plurality of bonding pads to electrically connect to a plurality of corresponding chip pads by respective wires, and includes an external point and a signal point respectively formed on the bottom of the cover plate.

7. The camera module as claimed in claim 6, wherein the intermediate step surface defines a voltage point to electrically connect a corresponding signal point.

8. The camera module as claimed in claim 3, wherein the number of the plurality of external points is equal to that of the plurality of zero voltage points.

9. The camera module as claimed in claim 1, wherein the cover plate is adhered to the bottom of the image sensor chip and the sub-assembly of the cover plate and the image sensor chip is received in the first recess of the circuit board.

10. The camera module as claimed in claim 1, wherein the at least one electronic element is selected one of passive elements and compositive elements.

11. The camera module as claimed in claim 1, wherein the lens holder has an internal thread formed thereof, the lens barrel has an external thread corresponding to and screwing with the internal thread of the lens holder, the external thread is formed on an external surface of the lens barrel.

12. The camera module as claimed in claim 1, further comprising an adhesive means applied surrounding the image sensor chip and covering the chip pads.

13. The camera module as claimed in claim 12, further comprising a transparent layer mounted to the image sensor chip via the adhesive means, the transparent layer together with the adhesive means sealing the photosensitive area of the image sensor chip.

14. The camera module as claimed in claim 13, wherein the transparent layer is a filter selected from one of made of glass and some other suitably transparent material.

15. A camera module comprising:
a lens barrel and at least one lens received in the lens barrel;
a lens holder threadedly engaged with the lens barrel;
a filter plate disposed in the lens holder;
an image sensor chip;
a circuit board coupled to the lens holder, the circuit board comprising an upper recess, a lower recess and an intermediate step surface formed between the upper recess and the lower recess, the image sensor chip being received in the upper recess, the circuit board comprising at least one radio frequency electronic element received in the lower recess, and at least one grounding contact formed on the intermediate step surface; and
an electromagnetic shielding plate attached on the intermediate step surface and covering the at least one radio frequency electrical element in the lower recess, the electromagnetic shielding plate being electrically connected to the at least one grounding contact.

* * * * *